US012658043B2

(12) United States Patent
Mitsui et al.

(10) Patent No.: US 12,658,043 B2
(45) Date of Patent: Jun. 16, 2026

(54) BEHAVIOR MANAGEMENT DEVICE, NON-TRANSITORY COMPUTER-READABLE STORAGE MEDIUM, AND BEHAVIOR MANAGEMENT METHOD

(71) Applicant: Mitsubishi Electric Corporation, Tokyo (JP)

(72) Inventors: Yoshiki Mitsui, Tokyo (JP); Kentaro Ishikawa, Tokyo (JP); Yoshie Imai, Tokyo (JP); Nobuaki Motoyama, Tokyo (JP); Satoru Furuta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 139 days.

(21) Appl. No.: 18/600,103

(22) Filed: Mar. 8, 2024

(65) Prior Publication Data
US 2024/0212499 A1 Jun. 27, 2024

Related U.S. Application Data

(63) Continuation of application No. PCT/JP2021/033652, filed on Sep. 14, 2021.

(51) Int. Cl.
*G08G 1/0968* (2006.01)
*G01C 21/34* (2006.01)

(52) U.S. Cl.
CPC ... *G08G 1/096838* (2013.01); *G01C 21/3484* (2013.01); *G01C 21/3492* (2013.01)

(58) Field of Classification Search
CPC ........... G08G 1/096838; G08G 1/0112; G08G 1/0145; G08G 1/0968; G01C 21/3484;
(Continued)

(56) References Cited

U.S. PATENT DOCUMENTS

2009/0143971 A1* 6/2009 Carruthers ......... G08G 1/09675
340/936
2019/0078902 A1* 3/2019 Zhong ................ G06Q 30/0207
(Continued)

FOREIGN PATENT DOCUMENTS

JP 2018-45296 A 3/2018
JP 2019-215224 A 12/2019
(Continued)

OTHER PUBLICATIONS

Extended European Search Report for European Application No. 21957425.8, dated Oct. 2, 2024.
(Continued)

*Primary Examiner* — Rami Khatib
(74) *Attorney, Agent, or Firm* — Birch, Stewart, Kolasch & Birch, LLP

(57) ABSTRACT

A behavior management server includes: a desired behavior specification unit that acquires, from a desiring user included in a plurality of users, a desired behavior including at least a destination desired to be visited by the desiring user; a route determination unit that determines a route to the destination; a congestion prediction unit that predicts whether or not an element included in the route becomes congested; an alternative plan determination unit that determines an alternative plan indicative of at least an alternative element that is an alternative to a congestion element, which is an element predicted to become congested, in order to avoid congestion of the congestion element; a target user decision unit that decides a target user to whom the alternative plan is to be proposed out of the plurality of users; and a proposal unit that proposes the alternative plan to the target user.

7 Claims, 13 Drawing Sheets

(58) Field of Classification Search
CPC .. G01C 21/3492; G01C 21/34; G06Q 10/047;
G06Q 10/063116
See application file for complete search history.

(56) References Cited

U.S. PATENT DOCUMENTS

| | | | | |
|---|---|---|---|---|
| 2020/0242421 A1* | 7/2020 | Sobhany | .............. | B60H 3/0007 |
| 2023/0243661 A1* | 8/2023 | Huang | ............... | G01C 21/3492 |
| | | | | 701/482 |

FOREIGN PATENT DOCUMENTS

| | | | | |
|---|---|---|---|---|
| JP | 2021-67639 A | | | 4/2021 |
| JP | 2021067639 A | * | | 4/2021 |

OTHER PUBLICATIONS

International Search Report (PCT/ISA/210) issued in PCT/JP2021/033652 mailed on Dec. 7, 2021.
Japanese Office Action for application No. 2022-524223 dated May 31, 2022.
European Office Action for European Application No. 21 957 425.8, dated Mar. 7, 2025.

* cited by examiner

Figure 4:
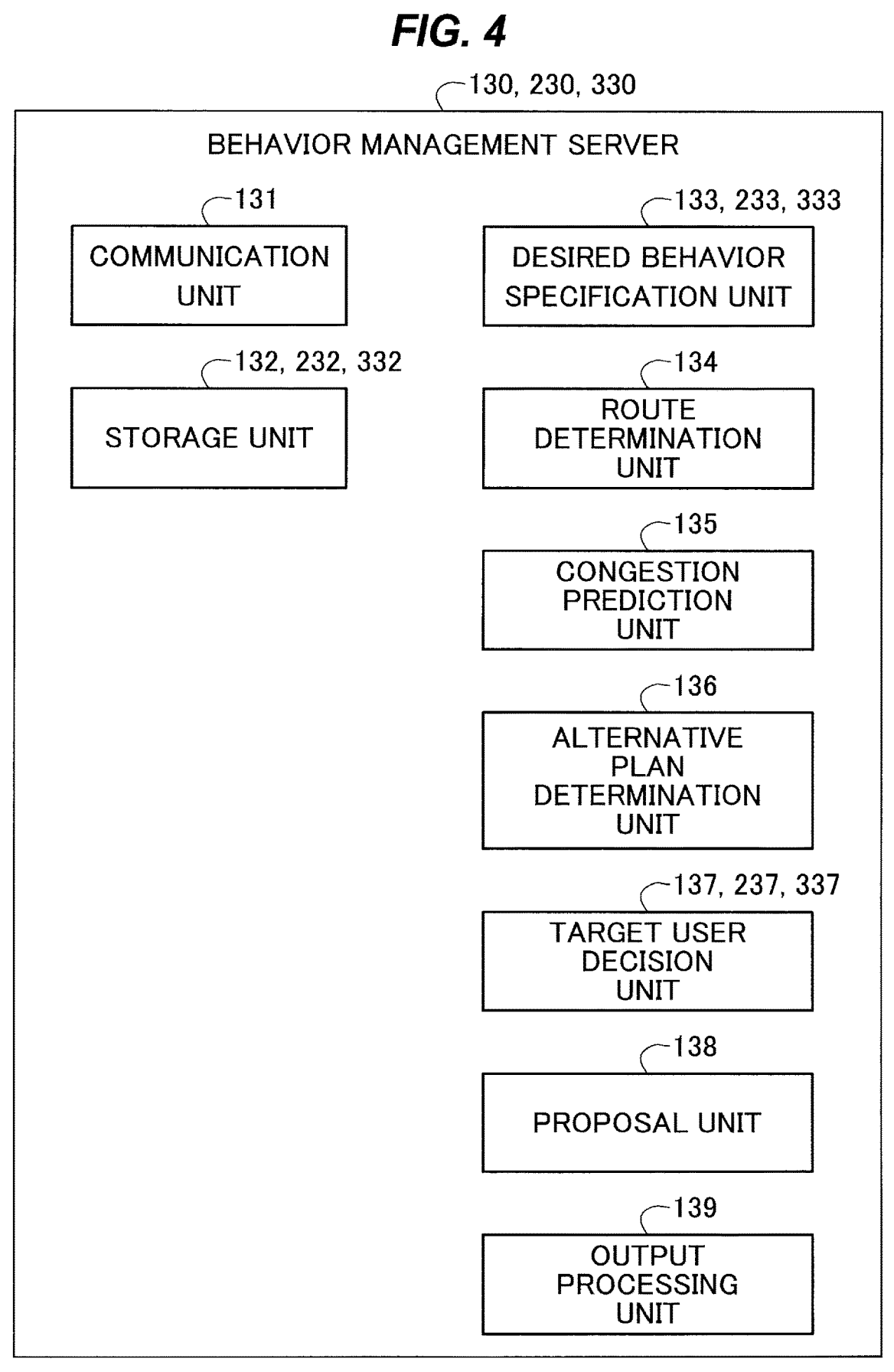

BEHAVIOR MANAGEMENT SERVER

131

COMMUNICATION UNIT 133, 233, 333

DESIRED BEHAVIOR SPECIFICATION UNIT 132, 232, 332

STORAGE UNIT

134

ROUTE DETERMINATION UNIT

135

CONGESTION PREDICTION UNIT

136

ALTERNATIVE PLAN DETERMINATION UNIT 137, 237, 337

TARGET USER DECISION UNIT

138

PROPOSAL UNIT

139

OUTPUT PROCESSING UNIT

150

| USER ID | DESIRED CONTENTS | PROPOSAL CONTENTS |
|---|---|---|
| | 150b | 150c |
| 150a | | |
| 1 | DESTINATION, WAYPOINT, ⋯ | DESTINATION, WAYPOINT, ⋯ |
| 2 | DESTINATION, WAYPOINT, ⋯ | DESTINATION, WAYPOINT, ⋯ |
| ⋮ | ⋮ | ⋮ |

FIG. 7

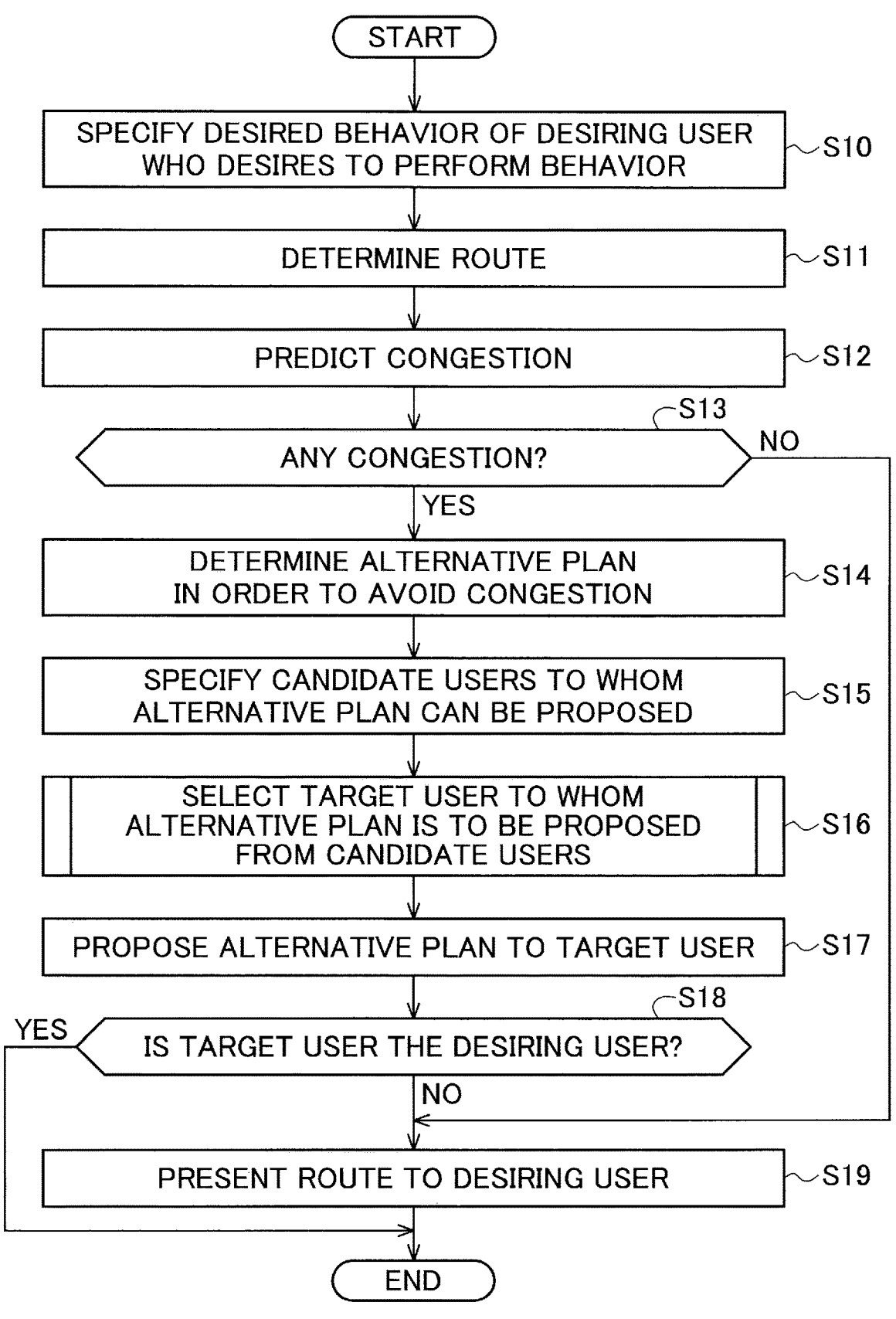

START

SPECIFY DESIRED BEHAVIOR OF DESIRING USER WHO DESIRES TO PERFORM BEHAVIOR ~S10

DETERMINE ROUTE ~S11

PREDICT CONGESTION ~S12

ANY CONGESTION? S13   NO

YES

DETERMINE ALTERNATIVE PLAN IN ORDER TO AVOID CONGESTION ~S14

SPECIFY CANDIDATE USERS TO WHOM ALTERNATIVE PLAN CAN BE PROPOSED ~S15

SELECT TARGET USER TO WHOM ALTERNATIVE PLAN IS TO BE PROPOSED FROM CANDIDATE USERS ~S16

PROPOSE ALTERNATIVE PLAN TO TARGET USER ~S17

IS TARGET USER THE DESIRING USER? S18   YES

NO

PRESENT ROUTE TO DESIRING USER ~S19

END

| USER ID | DESIRED CONTENTS | PROPOSAL CONTENTS | AGE | ADULT COMPANION NUMBER | CHILD COMPANION NUMBER | REGISTRATION DATE AND TIME |
|---|---|---|---|---|---|---|
| | 250b | 250c | 250d | 250e | 250f | 250g |
| 1 | DESTINATION, WAYPOINT, ... | DESTINATION, WAYPOINT, ... | 25 | 0 | 0 | 8/5 14:00 |
| 2 | DESTINATION, WAYPOINT, ... | DESTINATION, WAYPOINT, ... | 40 | 1 | 2 | 8/3 13:33 |
| 3 | DESTINATION, WAYPOINT, ... | DESTINATION, WAYPOINT, ... | 35 | 1 | 0 | 8/4 8:15 |
| ... | ... | ... | ... | ... | ... | ... |

250a

251

| CONDITION | ADDED POINT |
|---|---|
| LOCATION SERVING AS ALTERNATIVE PLAN IS CHANGED TO TARGET PLACE | 20 |
| USER IS 40 YEARS OLD OR OLDER | 1 |
| WITH ONE OR MORE CHILD COMPANIONS | 2 |
| THE NUMBER OF COMPANIONS IS THREE OR MORE | 1 |
| ELAPSED TIME FROM REGISTRATION OF DESIRED BEHAVIOR IS WITHIN ONE HOUR | 3 |

251a　251b

300

310A USER TERMINAL

310B USER TERMINAL

370 AUTONOMOUS VEHICLE

310C USER TERMINAL

101

130 BEHAVIOR MANAGEMENT SERVER

Figures 13, 14:
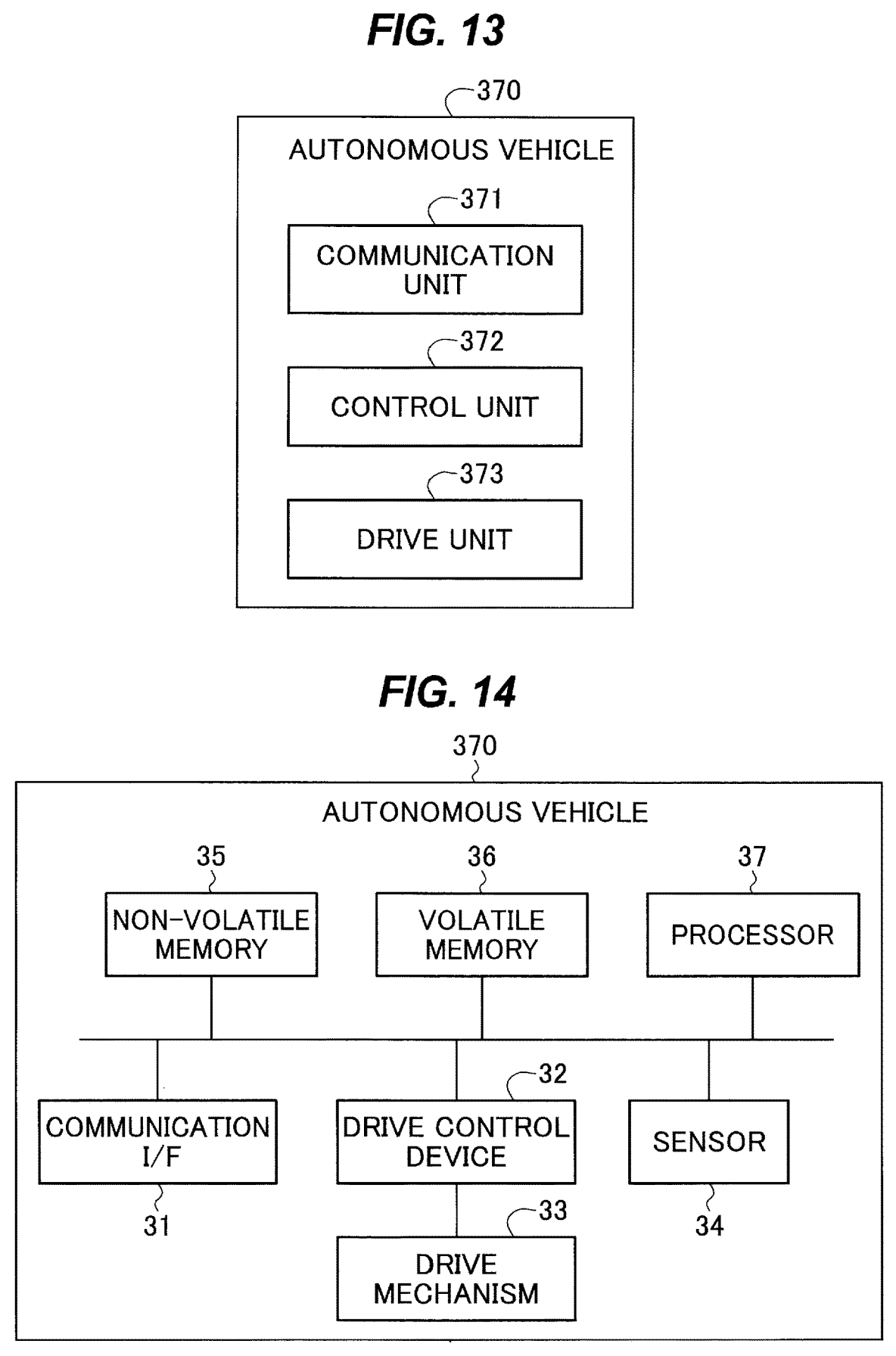

AUTONOMOUS VEHICLE

371
COMMUNICATION
UNIT

372
CONTROL UNIT

373
DRIVE UNIT

AUTONOMOUS VEHICLE

35
NON-VOLATILE
MEMORY

36
VOLATILE
MEMORY

37
PROCESSOR

COMMUNICATION
I/F

31

32
DRIVE CONTROL
DEVICE

SENSOR

34

33
DRIVE
MECHANISM

| USER ID | DESIRED CONTENTS | PROPOSAL CONTENTS | AGE | ADULT COMPANION NUMBER | CHILD COMPANION NUMBER | TRANS-PORTATION MEANS | REGISTRATION DATE AND TIME |
|---|---|---|---|---|---|---|---|
| | 350b | 350c | 350d | 350e | 350f | 350h | 350g |
| 1 | DESTINATION, WAYPOINT, ⋯ | DESTINATION, WAYPOINT, ⋯ | 25 | 0 | 0 | PMV | 8/5 14:00 |
| 2 | DESTINATION, WAYPOINT, ⋯ | DESTINATION, WAYPOINT, ⋯ | 40 | 1 | 2 | WALKING | 8/3 13:33 |
| 3 | DESTINATION, WAYPOINT, ⋯ | DESTINATION, WAYPOINT, ⋯ | 35 | 1 | 0 | BICYCLE | 8/4 8:15 |
| ⋯ | ⋯ | ⋯ | ⋯ | ⋯ | ⋯ | ⋯ | ⋯ |

350a

351

| CONDITION | ADDED POINT |
|---|---|
| 351a | 351b |
| AUTONOMOUS VEHICLE IS BEING USED | 20 |
| USER IS 40 YEARS OLD OR OLDER | 1 |
| WITH ONE OR MORE CHILD COMPANIONS | 2 |
| THE NUMBER OF COMPANIONS IS THREE OR MORE | 1 |
| ELAPSED TIME FROM REGISTRATION OF DESIRED BEHAVIOR IS WITHIN ONE HOUR | 3 |

*FIG. 18*

BEHAVIOR MANAGEMENT DEVICE, NON-TRANSITORY COMPUTER-READABLE STORAGE MEDIUM, AND BEHAVIOR MANAGEMENT METHOD

CROSS REFERENCE TO RELATED APPLICATION

This application is a continuation application of International Application No. PCT/JP2021/033652 having an international filing date of Sep. 14, 2021.

BACKGROUND OF THE INVENTION

1. Field of the Invention

The present disclosure relates to a behavior management device, a non-transitory computer-readable storage medium, and a behavior management method.

2. Description of the Related Art

In congested tourist sites, problems such as reduced tourist satisfaction and spread of infectious diseases may arise. Tourists would not be able to actively avoid the congestion in a sufficient manner due to factors such as uncertainty in current and future congestions and lack of familiarity with tourist sites.

For this reason, an information providing device is conventionally used to propose an alternative location when the destination of a user is congested (for example, see Patent Reference 1).

In the conventional technique, the alternative location is proposed to a user who has newly input a congested location as the destination, whereby the user can avoid going to the congested location.

[PATENT REFERENCE 1]: Japanese Patent Application Publication No. 2021-067639

SUMMARY OF THE INVENTION

However, in the conventional technique, the alternative location is proposed only to the user who has newly input the congested location as the destination, but is not proposed to a user who has already input that location as the destination. Thus, the conventional technique cannot effectively select a user to whom an alternative plan is to be proposed out of a plurality of users.

Accordingly, an object of one or more embodiments of the present disclosure is to enable the effective selection of a user to whom an alternative plan is to be proposed out of a plurality of users.

A behavior management device according to one aspect of the present disclosure is provided to manage behaviors of a plurality of users, the behavior management device including: a processor to execute a program; and a memory to store the program which, when executed by the processor, performs processes of, acquiring, from a desiring user included in the plurality of users, a desired behavior including at least a destination desired to be visited by the desiring user; determining a route to the destination; predicting whether or not an element included in the route becomes congested; determining an alternative plan indicative of at least an alternative element that is an alternative to a congestion element which is an element predicted to become congested in order to avoid congestion of the congestion element; deciding a target user to whom the alternative plan is to be proposed out of a plurality of candidate users who are the desiring user and one or more users who behave on a route partly including the congestion element apart from the desiring user in the plurality of users; and proposing the alternative plan to the target user.

A non-transitory computer-readable storage medium storing a program according to one aspect of the present disclosure is provided to cause a computer to serve as a behavior management device for managing behaviors of a plurality of users, the program causing the computer to execute processes comprising: acquiring, from a desiring user included in the plurality of users, a desired behavior including at least a destination desired to be visited by the desiring user; determining a route to the destination; predicting whether or not an element included in the route becomes congested; determining an alternative plan indicative of at least an alternative element that is an alternative to a congestion element which is an element predicted to become congested in order to avoid congestion of the congestion element; deciding a target user to whom the alternative plan is to be proposed out of a plurality of candidate users who are the desiring user and one or more users who behave on a route partly including the congestion element apart from the desiring user in the plurality of users; and proposing the alternative plan to the target user.

A behavior management method according to one aspect of the present disclosure is provided to manage behaviors of a plurality of users, the method including: acquiring, from a desiring user included in the plurality of users, a desired behavior including at least a destination desired to be visited by the desiring user; determining a route to the destination; predicting whether or not an element included in the route becomes congested; determining an alternative plan indicative of at least an alternative element that is an alternative to a congestion element which is an element predicted to become congested in order to avoid congestion of the congestion element; deciding a target user to whom the alternative plan is to be proposed out of a plurality of candidate users who are the desiring user and one or more users who behave on a route partly including the congestion element apart from the desiring user in the plurality of users; and proposing the alternative plan to the target user.

According to one or more aspects of the present disclosure, a user to whom an alternative plan is to be proposed can be selected effectively out of a plurality of users.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a block diagram schematically illustrating a configuration of a behavior management server in the first to third embodiments;

FIG. 7 is a flowchart illustrating a process of proposing an alternative plan in the behavior management server;

FIG. 10 is a schematic diagram illustrating a user management table which is an example of user management information in the second embodiment;

FIG. 13 is a block diagram schematically illustrating a configuration of an autonomous vehicle;

FIG. 14 is a block diagram schematically illustrating an example of a hardware configuration of the autonomous vehicle;

FIG. 15 is a schematic diagram illustrating a user management table which is an example of user management information in the third embodiment;

FIG. 18 is a sequence diagram for explaining a situation in which an alternative plan is proposed to a user different from a user who has input a desired behavior in the third embodiment.

DETAILED DESCRIPTION OF THE INVENTION

First Embodiment

Figure 1:
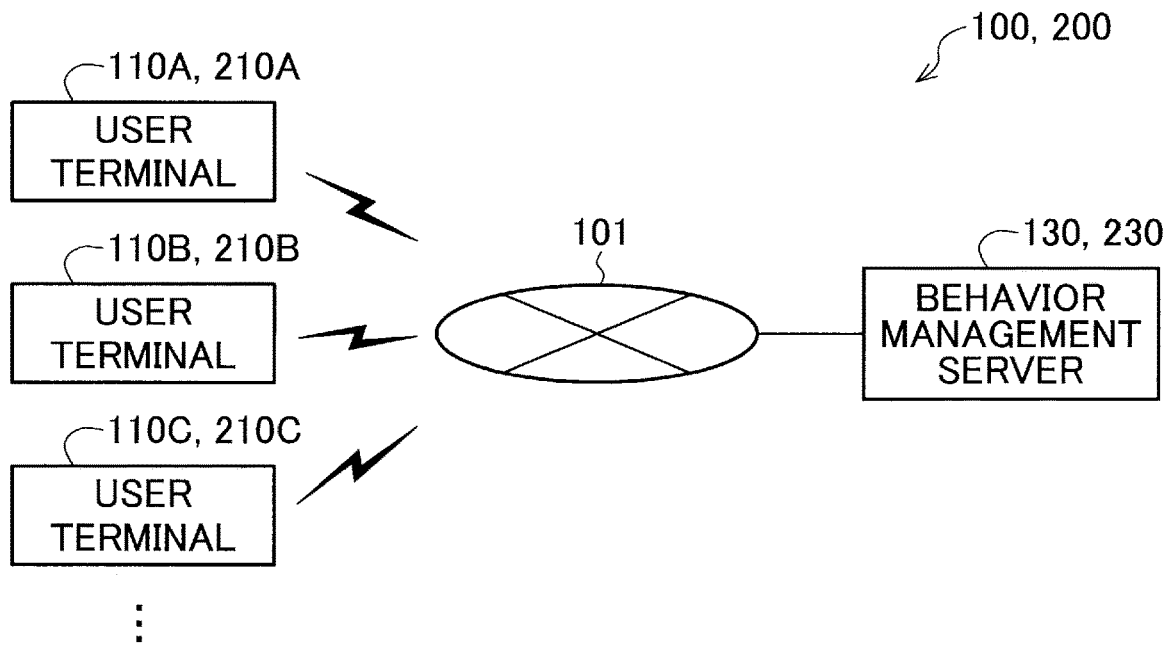
FIG. 1 is a block diagram schematically illustrating a configuration of a behavior management system according to first and second embodiments.

FIG. 1 is a block diagram schematically illustrating a configuration of a behavior management system 100 according to a first embodiment.

The behavior management system 100 includes a plurality of user terminals 110A, 110B, 110C, . . . used by a plurality of users and a behavior management server 130 that manages behaviors of the users.

The user terminals 110A, 110B, 110C, . . . and the behavior management server 130 are connected to a network 101 such as the Internet.

When it is not necessary to distinguish the user terminals 110A, 110B, 110C, . . . from each other, any of the user terminals 110A, 110B, 110C, . . . is referred to as a user terminal 110.

The number of the user terminals 110A, 110B, 110C, . . . is not particularly limited.

The behavior management server 130 here manages the behaviors of the users who use the respective user terminals 110A, 110B, 110C, . . . .

Figure 2:
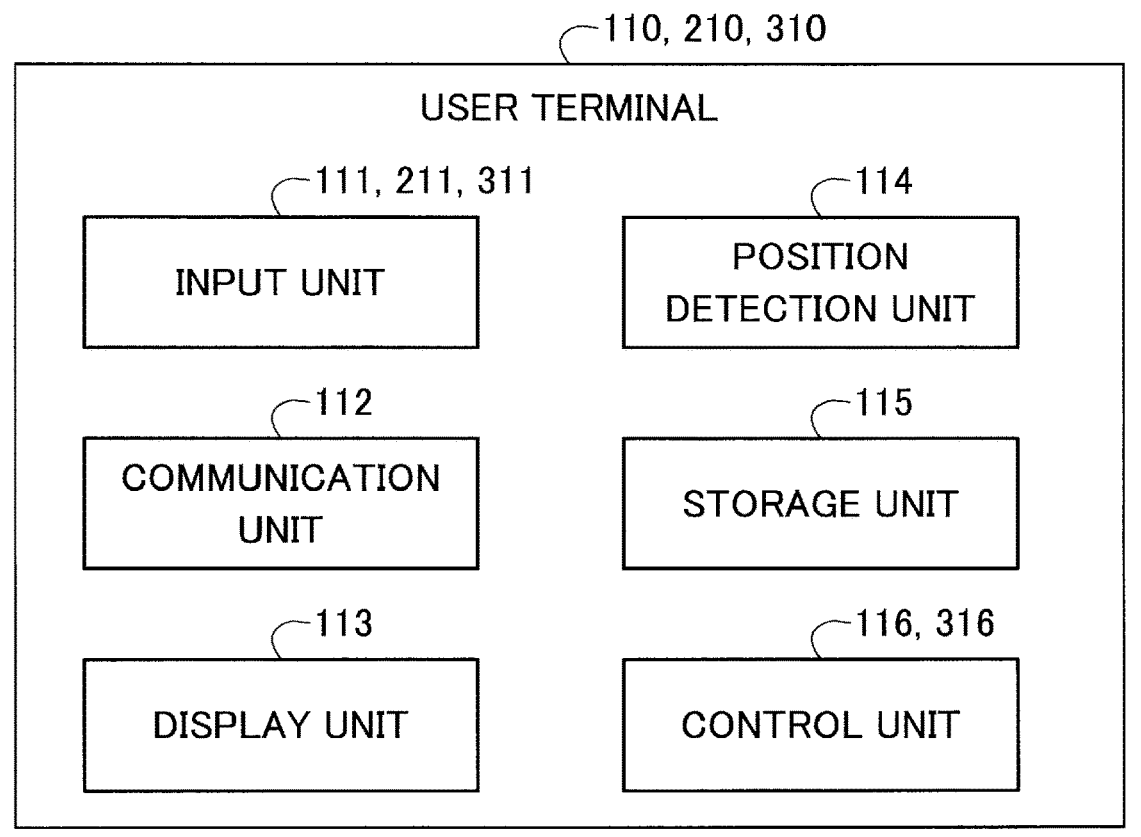
FIG. 2 is a block diagram schematically illustrating a configuration of a user terminal in the first to third embodiments.

FIG. 2 is a block diagram schematically illustrating the configuration of the user terminal 110 in the first embodiment.

The user terminal 110 includes an input unit 111, a communication unit 112, a display unit 113, a position detection unit 114, a storage unit 115, and a control unit 116.

The input unit 111 receives input of an instruction from a user. The input of the instruction from the user is also referred to as user input. For example, the input unit 111 receives, from the user, input of a desired behavior, which is a behavior desired by the user, or input about whether to approve an alternative plan described later. In the first embodiment, the input unit 111 receives input of a destination that is desired to be visited as the desired behavior by the user.

The communication unit 112 performs communication via the network 101.

The display unit 113 displays various screen images.

The position detection unit 114 detects the position of the user terminal 110. For example, the position detection unit 114 detects the position of the user terminal 110 by performing positioning using a GPS (Global Positioning System).

The storage unit 115 stores therein programs and data necessary for processing in the user terminal 110.

The control unit 116 controls processing in the user terminal 110.

For example, the control unit 116 generates desired behavior information indicative of the desired behavior input by the input unit 111 and causes the communication unit 112 to transmit the desired behavior information to the behavior management server 130.

The control unit 116 also generates positional information indicative of the position detected by the position detection unit 114 and causes the communication unit 112 to transmit the positional information to the behavior management server 130.

Further, when the communication unit 112 receives alternative plan information from the behavior management server 130, the control unit 116 generates an alternative plan screen image indicative of an alternative plan indicated by the alternative plan information and causes the display unit 113 to display the alternative plan screen image. When the input unit 111 receives input about whether to approve the alternative plan from the user, the control unit 116 generates approval information indicative of whether to approve the alternative plan and causes the communication unit 112 to transmit the approval information to the behavior management server 130.

When the communication unit 112 receives route information from the behavior management server 130, the control unit 116 generates a route screen image indicative of a route indicated by the route information and causes the display unit 113 to display the route screen image.

Figure 3:
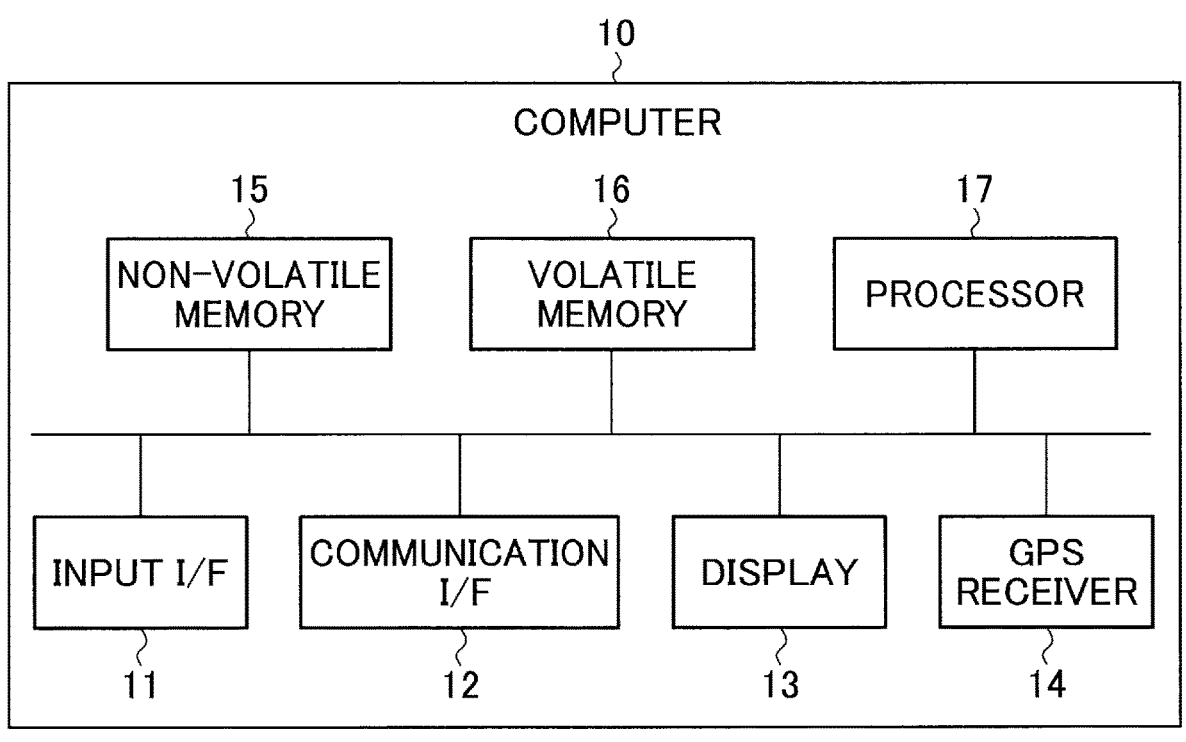
FIG. 3 is a block diagram illustrating an example of a hardware configuration of the user terminal.

The user terminal 110 described above can be implemented by, for example, a computer 10 such as that illustrated in FIG. 3.

The computer 10 includes an input interface (hereinafter, input I/F) 11, a communication interface (hereinafter, communication I/F) 12, a display 13, a GPS receiver 14, a non-volatile memory 15, a volatile memory 16, and a processor 17.

The input unit 111 can be implemented by the input I/F 11 such as a key device, the communication unit 112 can be implemented by a communication I/F 12 such as an NIC (Network Interface Card), and the display unit 113 can be implemented by the display 13. The position detection unit 114 can be implemented by the GPS receiver 14.

The input I/F 11 and the display 13 may be touch panels.

The storage unit 115 can be implemented by the non-volatile memory 15 or the volatile memory 16.

The control unit 116 can be implemented by the processor 17 which reads, into the volatile memory 16, a program that has been stored in the non-volatile memory 15 and then executes the program. Such a program may be provided through a network or may be provided by being recorded in a recording medium. That is, such a program may be provided, for example, as a program product.

FIG. 4 is a block diagram schematically illustrating the configuration of the behavior management server 130 in the first embodiment.

The behavior management server 130 is a behavior management device including a communication unit 131, a storage unit 132, a desired behavior specification unit 133, a route determination unit 134, a congestion prediction unit 135, an alternative plan determination unit 136, a target user decision unit 137, a proposal unit 138, and an output processing unit 139.

The communication unit 131 performs communication via the network 101. For example, the communication unit 131 receives desired behavior information from the user terminal 110. Since the desired behavior information indicates a desired behavior, the communication unit 131 functions as an acquisition unit that acquires the desired behavior.

The storage unit 132 stores therein programs and data necessary for processing in the behavior management server 130. For example, the storage unit 132 stores therein user management information indicative of information related to the contents that are to be proposed to a user.

Figures 5, 6:
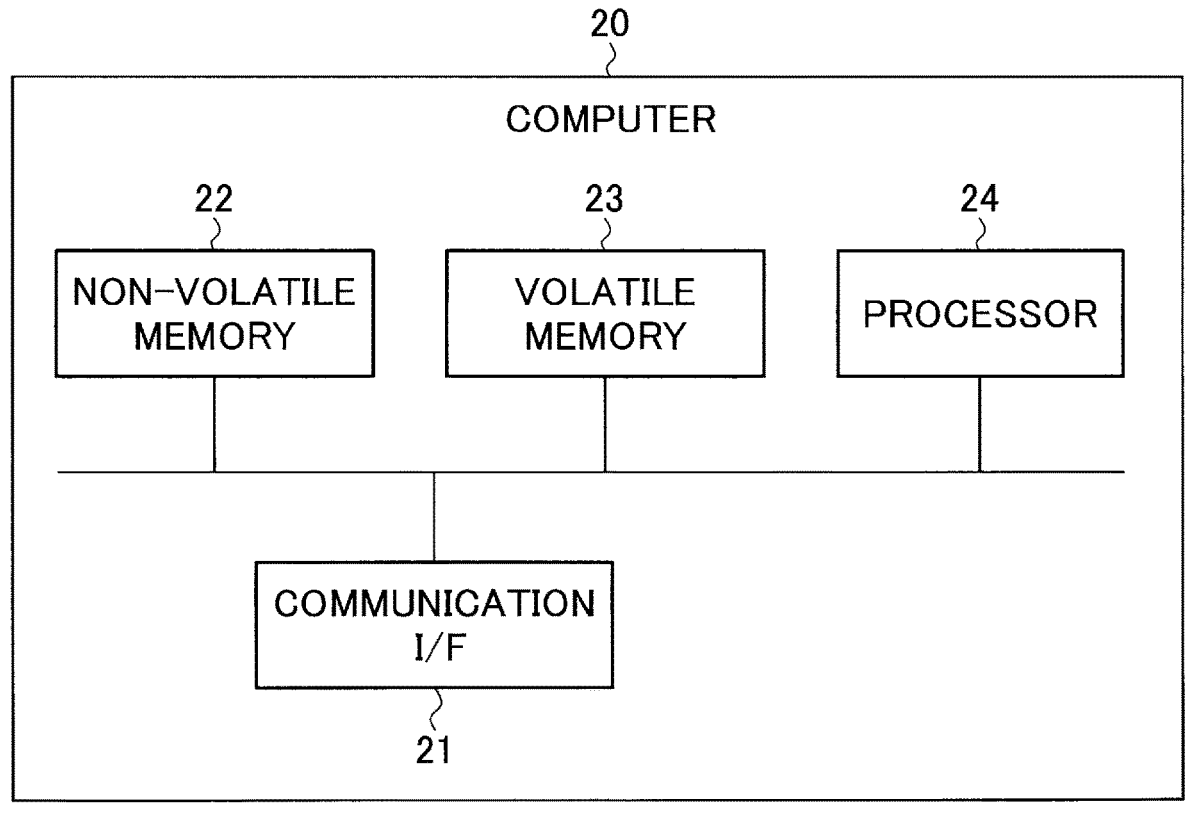
FIG. 5 is a schematic diagram illustrating a user management table which is an example of user management information in the first embodiment.
FIG. 6 is a block diagram illustrating an example of a hardware configuration of the behavior management server.

FIG. 5 is a schematic diagram illustrating a user management table 150 which is an example of the user management information in the first embodiment.

The user management table 150 illustrated in FIG. 5 is information in a table format, including a user ID column 150a, a desired content column 150b, and a proposal content column 150c.

The user ID column 150a stores a user ID, which is user identification information for identifying a user who uses the user terminal 110.

The desired content column 150b stores therein information related to the contents desired by the user. Here, the desired content column 150b stores a destination desired by the user and a waypoint determined based on the destination. Here, the destination desired by the user is also referred to as the desired destination, and the waypoint determined based on the desired destination is also referred to as the desired waypoint.

The proposal content column 150c stores the content proposed by the behavior management server 130 in accordance with the content desired by the user. Here, the proposal content column 150c stores a destination and a waypoint to the destination. Further, the destination and the waypoint proposed by the behavior management server 130 are also referred to as the proposed destination and the proposed waypoint, respectively.

As described above, according to the user management information, each user, the content desired by the user, and the content proposed to the user can be associated with each other.

Returning to FIG. 4, the desired behavior specification unit 133 specifies the desired behavior, which is the behavior desired by the user. Here, the desired behavior specification unit 133 specifies the desired behavior based on the desired behavior information received by the communication unit

6

131. In the first embodiment, the desired behavior includes the destination desired to be visited by the user.

The desired behavior specification unit 133 adds the desired behavior thus specified to the user management information stored in the storage unit 132. Specifically, the desired behavior specification unit 133 adds a new row to the user management table 150 stored in the storage unit 132, stores the user ID of the user of the user terminal 110 that has transmitted the desired behavior information in the user ID column 150a of the row, and stores the destination indicated by the desired behavior information in the desired content column 150b of the row. Here, the user ID may be included in the desired behavior information, or may be stored in the storage unit 132 in advance in association with a communication address such as an Internet Protocol (IP) address of the user terminal 110.

The route determination unit 134 determines a route from the position indicated by the positional information provided from the user terminal 110, to the destination desired to be visited by the user. For example, the route determination unit 134 may determine the route according to an existing algorithm that minimizes an objective function in accordance with the setting for the user, for example, minimizes the required time or the cost. The route determination unit 134 then specifies a waypoint included in the determined route and adds the waypoint to the user management information stored in the storage unit 132. Specifically, in the user management table 150 stored in the storage unit 132, the route determination unit 134 stores the waypoint in the desired content column 150b which is in the same row as the destination used when determining the route.

The congestion prediction unit 135 predicts whether an element included in the route determined by the route determination unit 134 becomes congested. In the first embodiment, the elements are the destination and the waypoint.

Specifically, the congestion prediction unit 135 refers to the user management information stored in the storage unit 132 to count the number of other users who are scheduled to visit each of the destination and the waypoint included in the route determined by the route determination unit 134, and predicts that the location becomes congested when the counted number exceeds a predetermined threshold. Specifically, for each of the destination specified by the desired behavior specification unit 133 and the waypoint included in the route determined by the route determination unit 134, the congestion prediction unit 135 counts the numbers of associated destinations and waypoints included in the proposal content column 150c of the user management table 150 stored in the storage unit 132.

The alternative plan determination unit 136 determines an alternative plan indicative of at least an alternative element, which is an alternative to a congestion element that has been predicted to become congested in order to avoid congestion of the congestion element.

For example, the alternative plan determination unit 136 defines, as a target place, one of the destinations and waypoints that are judged to become congested by the congestion prediction unit 135, and determines an alternative plan that substitutes another location for the target place. In the storage unit 132 of the behavior management server 130, a category is predetermined for each location that can be set as a destination or a waypoint in the behavior management server 130. A location that falls in the same category as the target place and is closest to the target place is set as an alternative plan.

The target user decision unit 137 decides a target user to whom the alternative plan is to be proposed out of a plurality of users managed by the behavior management server 130.

In the first embodiment, the target user decision unit 137 decides, as the target user, a user who is most likely to be satisfied by accepting the alternative plan, out of the plurality of users.

For example, the target user decision unit 137 defines one or more users, out of the plurality of users, who are behaving on a route partly including the congestion element, as one or more candidate users. The target user decision unit 137 then assigns values to the one or more candidate users based on a predetermined criterion, and decides, as the target user, a user having the highest score obtained by adding up the assigned values.

In the first embodiment, the target user decision unit 137 assigns values in such a manner that the score of a user who is behaving after having already accepted another alternative plan substituting the congestion element for the alternative element becomes the highest out of the one or more candidate users.

Specifically, the target user decision unit 137 assigns an initial value of the score to each of the one or more candidate users. The initial value here is, for example, "0". The target user decision unit 137 then refers to the user management information stored in the storage unit 132, and adds a predetermined value to the score of a user, out of the candidate users, who has initially desired a location previously defined as the alternative plan but has then approved a location of the target place which is a congestion element as another alternative plan. Specifically, the target user decision unit 137 specifies a user whose desired content column 150b includes an alternative place and whose proposal content column 150c includes the target place instead of the alternative place in the user management table 150 stored in the storage unit 132, and adds a predetermined value to the score of the user.

The target user decision unit 137 then decides a user who has the highest score as the target user. In a case where there is a plurality of users having the highest score, the target user decision unit 137 may decide one user selected from the users at random as the target user or may decide all the users as the target users.

The proposal unit 138 proposes an alternative plan to the target user. For example, the proposal unit 138 generates a proposal screen image including: a message that recommends the changing of the target place to the alternative plan; an approval button which is an approval input region for performing input for approving change of the target place to the alternative plan; and a reject button which is a rejection input region for performing input for rejecting change of the target place to the alternative plan. The proposal unit 138 then causes the communication unit 131 to transmit the proposal screen image to the user terminal 110 used by the target user.

When the output processing unit 139 acquires approval information indicative of approval of the alternative plan from the user terminal 110 used by the target user via the communication unit 131, the output processing unit 139 generates route information indicative of a route including the alternative plan and causes the communication unit 131 to transmit the route information to the user terminal 110 used by the target user.

Here, in a case where the target user is not a desiring user who has input the desired behavior this time, the output processing unit 139 generates the route information indicative of the route determined by the route determination unit

134 and causes the communication unit 131 to transmit the route information to the user terminal 110 used by the desiring user.

Further, the output processing unit 139 updates the user management information stored in the storage unit 132 with the alternative plan.

Specifically, in a case where the target user is not the desiring user, the output processing unit 139 replaces the target place in the proposal content column 150c of the row for the target user with the alternative plan in the user management table 150 stored in the storage unit 132.

Meanwhile, in a case where the target user is the desiring user, the output processing unit 139 stores the contents, which have been stored in the desired content column 150b in the row for the desiring user, also in the proposal content column 150c of the user management table 150 stored in the storage unit 132, thereby replacing the target place in the proposal content column 150c with the alternative plan.

Here, when the output processing unit 139 acquires approval information indicative of rejection of the alternative plan from the user terminal 110 used by the target user via the communication unit 131, the output processing unit 139 may not output the alternative plan, or alternatively it may generate route information indicative of a route including the alternative plan and may cause the communication unit 131 to transmit the route information to the user terminal 110 used by the desiring user.

When the user has reached the destination, the output processing unit 139 deletes information related to the user from the user management information stored in the storage unit 132. Specifically, when the position indicated by the positional information acquired from the user terminal 110 via the communication unit 131 has reached within a predetermined range from the destination of the user in the proposal content column 150c of the user management table 150 stored in the storage unit 132, the output processing unit 139 deletes the row for the user. Thus, only a user who is currently behaving can be managed.

In this case, the output processing unit 139 may store the content of the deleted row in the storage unit 132 as history information. It is desirable that the date and time at which the user reached the destination or within a predetermined range from the destination be added to the history information.

The behavior management server 130 described above can be implemented by, for example, a computer 20 illustrated in FIG. 6.

The computer 20 includes a communication I/F 21, a non-volatile memory 22, a volatile memory 23, and a processor 24.

The communication unit 131 can be implemented by the communication I/F 12 such as an NIC.

The storage unit 132 can be implemented by the non-volatile memory 22 or the volatile memory 23.

The desired behavior specification unit 133, the route determination unit 134, the congestion prediction unit 135, the alternative plan determination unit 136, the target user decision unit 137, the proposal unit 138, and the output processing unit 139 can be implemented by the processor 24 reading out a program stored in the non-volatile memory 22 into the volatile memory 23 and then executing the program.

Such a program may be provided through a network or may be provided by being recorded in a recording medium. That is, such a program may be provided as a program product, for example.

FIG. 7 is a flowchart illustrating a process of proposing an alternative plan in the behavior management server 130.

First, when the communication unit 131 receives desired behavior information from one user terminal 110, the desired behavior specification unit 133 specifies a desired behavior based on the desired behavior information (S10). It is assumed here that the desired behavior includes the desired destination, which is the destination desired to be visited by the user. The desired behavior specification unit 133 then adds the desired destination, which is the desired behavior specified, to the user management information stored in the storage unit 132.

Next, the route determination unit 134 determines a route from the position indicated by positional information provided from the one user terminal 110 to the desired destination specified in step S10 (S11). The route determination unit 134 then specifies a waypoint included in the determined route and adds the waypoint to the user management information stored in the storage unit 132.

Next, the congestion prediction unit 135 predicts whether either the desired destination or the waypoint included in the route to the desired destination becomes congested (S12).

The congestion prediction unit 135 then judges whether congestion occurs at either the desired destination or the waypoint (S13). If congestion occurs (Yes in S13), the process proceeds to step S14. If no congestion occurs (No in S13), the process proceeds to step S19.

In step S14, the alternative plan determination unit 136 determines an alternative plan that regards one location judged to become congested by the congestion prediction unit 135 as a target place and then substitutes an alternative place which is another location for the target place (S14).

Next, the target user decision unit 137 specifies, as candidate users, a plurality of users who are to visit the target place which is the one location predicted to become congested by the congestion prediction unit 135 (S15).

Next, the target user decision unit 137 decides a target user to whom the alternative plan is to be proposed, out of the candidate users (S16). The process in this step will be described in detail with reference to FIG. 8.

Next, the proposal unit 138 proposes the alternative plan to the target user (S17).

Next, the output processing unit 139 judges whether the target user is a desiring user who is the user of one user terminal 110 that has transmitted the desired behavior (S18). If the target user is the desiring user (Yes in S18), the process is ended. If the target user is not the desiring user (No in S18), the process proceeds to step S19.

In step S19, the output processing unit 139 presents the route determined by the route determination unit 134 to the desiring user.

Figure 8:
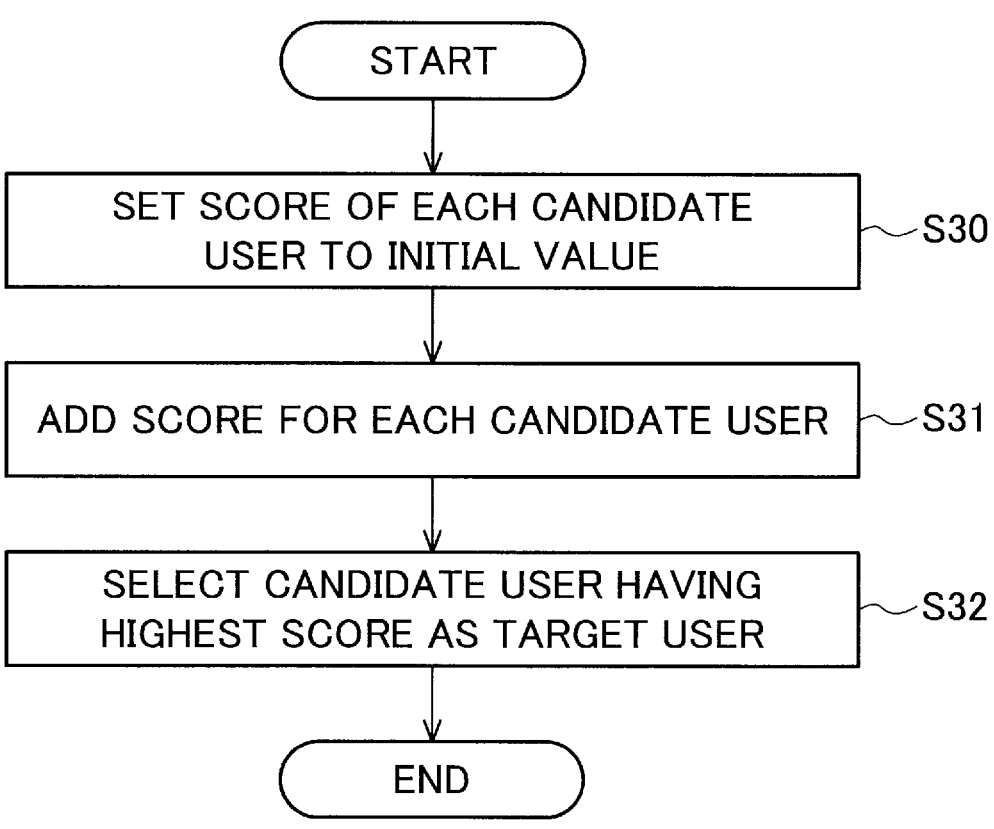
FIG. 8 is a schematic diagram illustrating a process of deciding a target user by a target user decision unit.

FIG. 8 is a schematic diagram illustrating the process of determining the target user by using the target user decision unit 137.

First, the target user decision unit 137 sets an initial value to the score assigned to each candidate user (S30). The initial value here is, for example, "0".

Next, the target user decision unit 137 refers to the user management information stored in the storage unit 132, and adds a predetermined value to the score of a user, out of the candidate users, who has initially desired a location previously defined as the alternative place but has then approved an alternative plan that substitutes the target place for the alternative place (S31).

The target user decision unit 137 then decides a user who has the highest score as the target user (S32).

Figure 9:
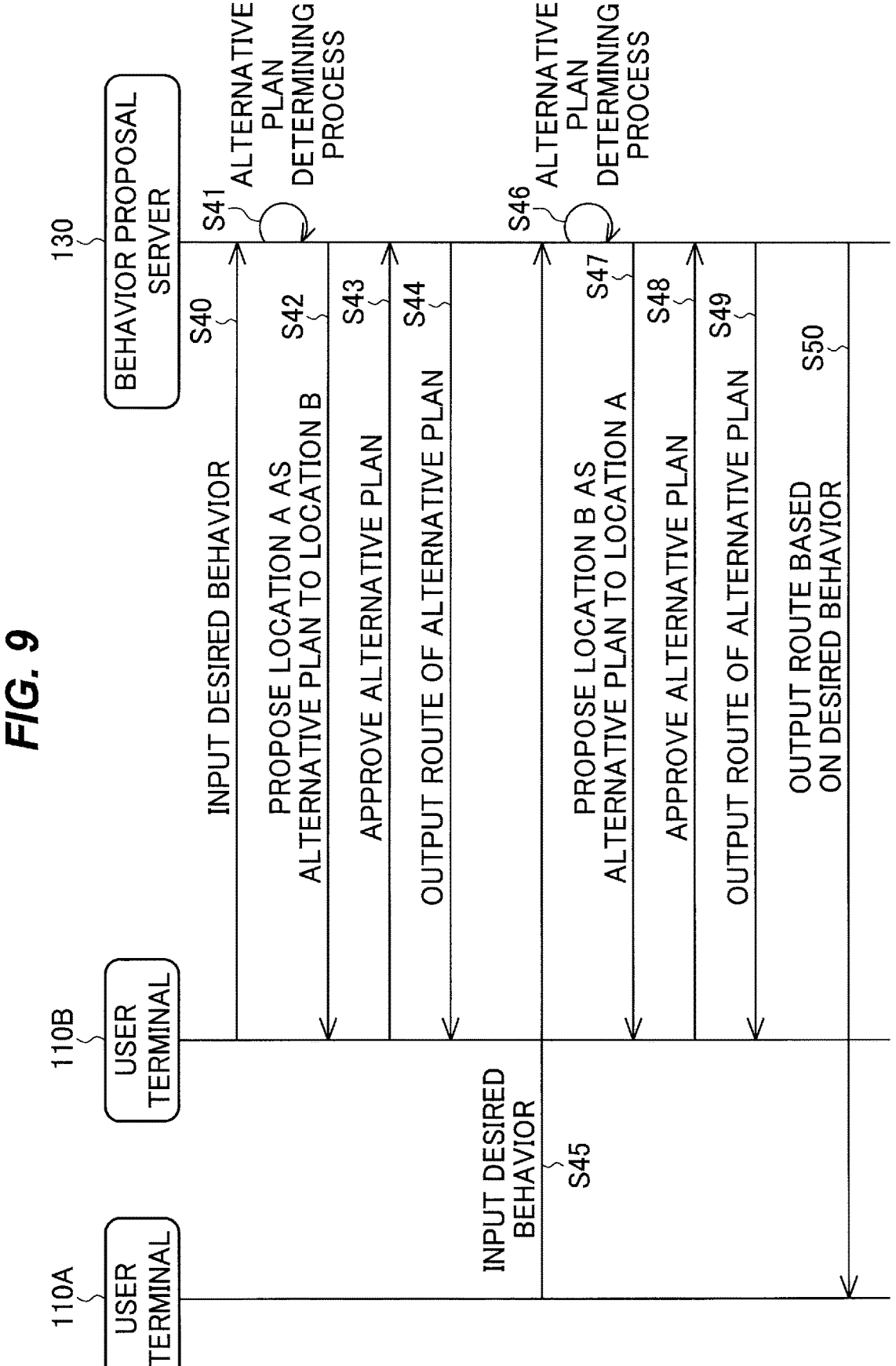
FIG. 9 is a sequence diagram for explaining a situation in which an alternative plan is proposed to a user different from a user who has input a desired behavior in the first embodiment.

FIG. 9 is a sequence diagram for explaining a situation in which an alternative plan is proposed to a user different from a user who has input a desired behavior in the first embodiment.

Here, a description will be given assuming that the user terminals 110A and 110B receive input of respective desired behaviors.

First, the input unit 111 of the user terminal 110B receives input of a location B which is a desired destination as a desired behavior. The control unit 116 of the user terminal 110B generates desired behavior information indicative of the location B and transmits the desired behavior information to the behavior management server 130 from the communication unit 112 (S40).

When the behavior management server 130 receives the desired behavior information indicative of the location B from the user terminal 110B, the route determination unit 134 of the behavior management server 130 determines a route from the current location of the user terminal 110B to the location B and specifies a waypoint included in the route. The congestion prediction unit 135 then predicts whether the location B and the waypoint become congested. Here, it is assumed that the location B is judged to become congested. In this case, for example, the alternative plan determination unit 136 determines an alternative plan to the location B (S41). Here, it is assumed that a location A is used as the alternative plan.

The target user decision unit 137 then decides the user of the user terminal 110B as the target user, and the proposal unit 138 proposes the changing of the destination from the location B to the location A as the alternative plan to the user of the user terminal 110B (S42).

In this case, it is assumed that a proposal screen image including a message that recommends the changing of the location B to the location A is displayed on the display unit 113 of the user terminal 110B, and the user of the user terminal 110B approves such an alternative plan via the input unit 111. The control unit 116 of the user terminal 110B generates approval information indicating that the user approves the alternative plan, and transmits the approval information to the behavior management server 130 via the communication unit 112 (S43).

The output processing unit 139 of the behavior management server 130 generates route information indicative of a route to the location A, which is the alternative plan, and causes the communication unit 131 to transmit the route information to the user terminal 110B (S44).

In the situation described above, the input unit 111 of the user terminal 110A receives input of the location A, which is a desired destination, as a desired behavior. The control unit 116 of the user terminal 110A generates desired behavior information indicative of the location A and transmits the desired behavior information to the behavior management server 130 from the communication unit 112 (S45).

When the behavior management server 130 receives the desired behavior information indicative of the location A from the user terminal 110A, the route determination unit 134 of the behavior management server 130 determines a route from the current location of the user terminal 110A to the location A and specifies a waypoint included in the route. The congestion prediction unit 135 then predicts whether the location A and the waypoint become congested. Here, it is assumed that the location A is judged to become congested. In this case, for example, the alternative plan determination unit 136 determines an alternative plan to the location A (S46). Here, it is assumed that the location B is used as the alternative plan.

In such a case, the target user decision unit 137 calculates the score by assigning a high value to a user of the user terminal 110B who has already accepted the alternative plan for changing the location B to the location A, and decides the user of the user terminal 110B as the target user. As the alternative plan to the location A, the proposal unit 138 then proposes the setting of the location B as the destination to the user of the user terminal 110B (S47).

A proposal screen image including a message that recommends the changing of the location A to the location B is displayed on the display unit 113 of the user terminal 110B. It is expected that the user of the user terminal 110B easily accepts such an alternative plan because the user has originally desired to visit the location B as the desired destination instead of the location A. Then, when the input unit 111 of the user terminal 110B receives input of approval of this alternative plan, the control unit 116 of the user terminal 110B generates approval information indicating that the alternative plan is approved, and transmits the approval information to the behavior management server 130 via the communication unit 112 (S48).

In this case, the output processing unit 139 of the behavior management server 130 generates route information indicative of a route to the location B, which is the alternative plan, and causes the communication unit 131 to transmit the route information to the user terminal 110B (S49).

The output processing unit 139 of the behavior management server 130 also generates route information indicative of a route to the location A, which is the desired destination for the user terminal 110A, and causes the communication unit 131 to transmit the route information to the user terminal 110A (S50).

As described above, according to the first embodiment, an alternative plan is proposed again to a user who has already accepted a previous alternative plan in such a manner that the user's original desire is met. Thus, the possibility that the alternative plan is accepted can be enhanced, and original desires of both a user who has input a desired behavior and a user to whom the alternative plan is proposed are met, so that the satisfaction of both the users is improved.

Second Embodiment

Next, a second embodiment is described. The second embodiment uses various types of information related to the user to calculate the score in selecting a target user.

As illustrated in FIG. 1, a behavior management system 200 according to the second embodiment includes a plurality of user terminals 210A, 210B, 210C, . . . and a behavior management server 230.

The user terminals 210A, 210B, 210C, . . . and the behavior management server 230 are connected to the network 101 such as the Internet.

When it is not particularly necessary to distinguish the user terminals 210A, 210B, 210C, . . . from each other, any one of the user terminals 210A, 210B, 210C, . . . is referred to as the user terminal 210.

The number of user terminals 210A, 210B, 210C, . . . is not particularly limited.

As illustrated in FIG. 2, the user terminal 210 in the second embodiment includes an input unit 211, the communication unit 112, the display unit 113, the position detection unit 114, the storage unit 115, and the control unit 116.

The communication unit 112, the display unit 113, the position detection unit 114, the storage unit 115, and the control unit 116 of the user terminal 210 in the second embodiment are the same as the communication unit 112, the display unit 113, the position detection unit 114, the storage unit 115, and the control unit 116 of the user terminal 110 in the first embodiment, respectively.

The input unit 211 receives input of an instruction from a user. The input of the instruction from the user is also referred to as user input. For example, the input unit 211 receives, from the user, input of a desired behavior, which is a behavior desired by the user, or input about whether to approve an alternative plan described later.

In the second embodiment, the input unit 211 receives, as the desired behavior, input of user-related information regarding a behaving person, such as the age of the user, the number of adult companions, and the number of child companions, in addition to the destination that is desired to be visited by the user. The control unit 116 generates desired behavior information indicative of the desired behavior input to the input unit 111 and causes the communication unit 112 to transmit the desired behavior information to the behavior management server 230, as in the first embodiment.

As illustrated in FIG. 4, the behavior management server 230 in the second embodiment includes the communication unit 131, a storage unit 232, a desired behavior specification unit 233, the route determination unit 134, the congestion prediction unit 135, the alternative plan determination unit 136, a target user decision unit 237, the proposal unit 138, and the output processing unit 139.

The communication unit 131, the route determination unit 134, the congestion prediction unit 135, the alternative plan determination unit 136, the proposal unit 138, and the output processing unit 139 of the behavior management server 230 in the second embodiment are the same as the communication unit 131, the route determination unit 134, the congestion prediction unit 135, the alternative plan determination unit 136, the proposal unit 138, and the output processing unit 139 of the behavior management server 130 in the first embodiment, respectively.

The storage unit 232 stores therein programs and data necessary for processing in the behavior management server 230. For example, the storage unit 232 stores therein the user management information indicative of information related to the contents which are to be proposed to a user, as well as point addition condition information.

FIG. 10 is a schematic diagram illustrating a user management table 250 which is an example of the user management information in the second embodiment.

The user management table 250 illustrated in FIG. 10 is information in a table format, including a user ID column 250a, a desired content column 250b, a proposal content column 250c, an age column 250d, an adult companion number column 250e, a child companion number column 250f, and a registration date and time column 250g.

The user ID column 250a stores a user ID which is user identification information for identifying a user who uses the user terminal 210.

The desired content column 250b stores information related to the content desired by the user. Here, the desired content column 250b stores a destination desired by the user and a waypoint determined based on the destination. Here, the destination desired by the user is also referred to as the desired destination, and the waypoint determined based on the desired destination is also referred to as the desired waypoint.

The proposal content column 250c stores the content proposed by the behavior management server 230 in accordance with the content desired by the user. Here, the proposal content column 250c stores the destination and the waypoint to the destination. Further, the destination and the waypoint proposed by the behavior management server 130 are also herein referred to as the proposed destination and the proposed waypoint, respectively.

The age column 250*d* stores the age of the user.

The adult companion number column 250*e* stores the number of adult companions.

The child companion number column 250*f* stores the number of child companions.

The registration date and time column 250*g* indicates the date and time at which a row corresponding to each record is added to the user management table 250.

Figures 11, 12:
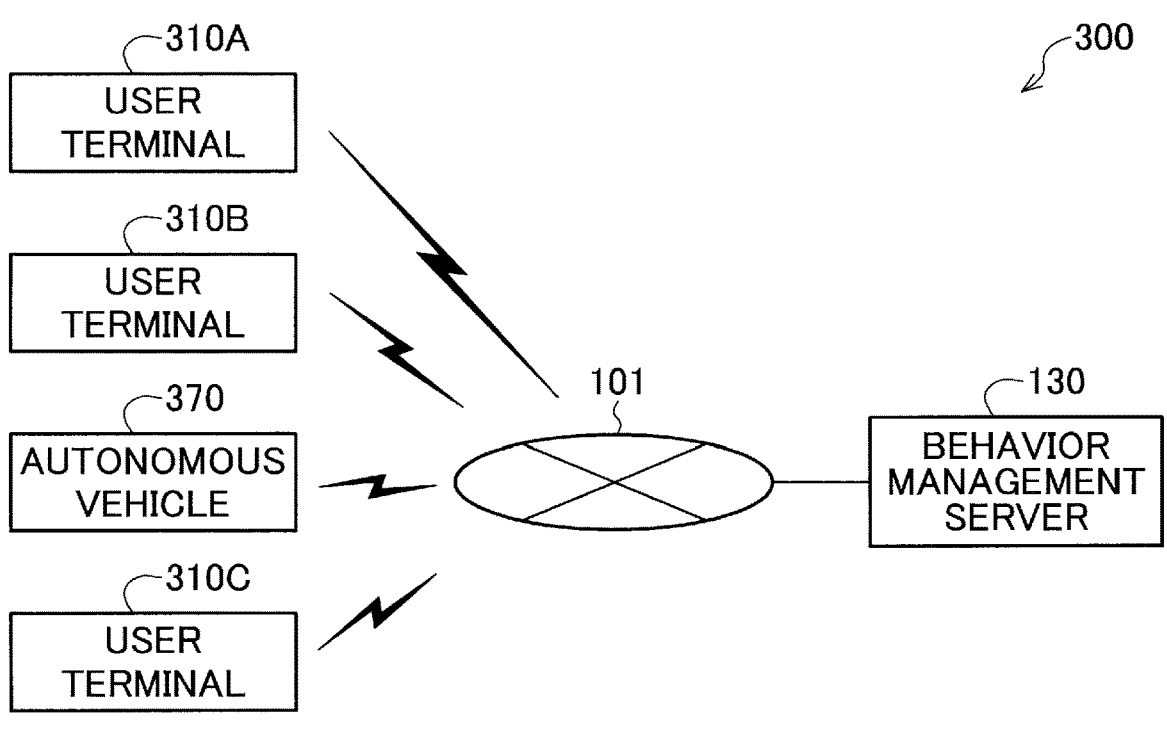
FIG. 11 is a schematic diagram illustrating a point addition condition table which is an example of point addition condition information in the second embodiment.
FIG. 12 is a block diagram schematically illustrating a configuration of a behavior management system according to the third embodiment.

FIG. 11 is a schematic diagram illustrating a point addition condition table 251, which is an example of the point addition condition information in the second embodiment.

The point addition condition table 251 illustrated in FIG. 11 is information in a table format, including a condition column 251*a* and an added point column 251*b*.

The condition column 251*a* stores a condition for point addition to the score of each user.

For example, a user who has substituted a location that is to be an alternative plan for a target place predicted to become congested is most likely to accept the alternative plan, and thus point addition is performed.

Further, when the age of the user is equal to or older than a certain age, it is considered that the user tends to dislike congestion. Therefore, when the age of the user is equal to or older than the certain age, it is considered that the user is most likely to accept change to a less congested location, and thus point addition is performed. Although the age of the user for whom point addition is performed is 40 years old or more here, the age is not limited thereto.

In addition, it is considered that since users with children tend to prefer less congested locations, they are most likely to accept change to a less congested destination, and thus point addiction is performed.

Further, it is also considered that since users with many companions tend to prefer less congested locations, they are most likely to accept change to a less congested destination, and thus point addition is performed. The number of companions can be obtained by adding the number of adult companions and the number of child companions.

Furthermore, the user for whom it has not been long since input of the desired behavior is considered to be still far from the destination and most likely to accept the alternative plan. Thus, point addition is performed. Here, the elapsed time from registration is set to be within one hour, but is not limited thereto.

The added point column 251*b* stores a value to be added when the condition is satisfied.

The values illustrated in FIG. 11 are merely examples and are not limited thereto.

However, when the condition in which the location serving as the alternative plan is changed to the target place is satisfied, a value to be added is desirably larger than the total point of values to be added when all other conditions are satisfied. This is because it is considered that the user who satisfies such a condition positively accepts the alternative plan.

As described above, the point addition condition information is set in such a manner that a larger value is added for a condition having a higher possibility that the alternative plan is accepted.

Returning to FIG. 4, the desired behavior specification unit 233 specifies the desired behavior which is the behavior desired by the user. Here, the desired behavior specification unit 233 specifies the desired behavior based on desired behavior information received by the communication unit 131. The desired behavior here includes the destination that is desired to be visited by the user and the user-related information.

The desired behavior specification unit 233 adds the desired behavior thus specified to the user management information stored in the storage unit 232. Specifically, the desired behavior specification unit 233 adds a new row to the user management table 250 stored in the storage unit 232, stores a user ID of a user of the user terminal 210 that has transmitted the desired behavior information in the user ID column 250*a* of the row, stores the destination indicated by the desired behavior information in the desired content column 250*b* of the row, stores the age indicated by the desired behavior information in the age column 250*d* of the row, stores the number of adult companions indicated by the desired behavior information in the adult companion number column 250*e* of the row, stores the number of child companions indicated by the desired behavior information in the child companion number column 250*f* of the row, and stores the date and time, at which the row is added, in the registration date and time column 250*g* of the row.

The target user decision unit 237 defines a plurality of users who are to visit the location predicted to become congested by the congestion prediction unit 135 as candidate users and decides a target user to which an alternative plan is to be proposed out of the candidate users.

For example, the target user decision unit 237 assigns an initial value of the score to each candidate user. The initial value here is, for example, "0". The target user decision unit 237 then refers to the user management information and the point addition condition information both stored in the storage unit 232, and performs point addition for the candidate user who satisfies the condition indicated by the point addition condition information, thereby calculating the score for each candidate user.

The target user decision unit 237 then decides a user who has the highest score as the target user. Here, in a case where there is a plurality of users having the highest score, the target user decision unit 237 may decide one user selected from the users at random as the target user or may decide all the users as the target users.

As described above, in the second embodiment, since the score for deciding the target user is calculated based on information related to the user, the target user to whom the alternative plan is to be proposed can be decided according to the situation of the user.

The conditions illustrated in FIG. 11 are merely examples, and point addition to the score may be performed under other conditions. For example, approval history information indicative of the number of approvals of an alternative plan in the past for each user may be stored in the storage unit 232 of the behavior management server 230, and an alternative location selection tendency that becomes a larger value as the number of approvals increases may be added to the score of each user in addition to or instead of the above example.

Third Embodiment

Next, a third embodiment is described. In the third embodiment, an alternative plan is automatically put into practice to enable effective alleviation of the congestion by using the alternative plan.

FIG. 12 is a block diagram schematically illustrating the configuration of a behavior management system 300 according to the third embodiment.

The behavior management system 300 includes a plurality of user terminals 310A, 310B, 310C, . . . and a behavior management server 330.

The user terminals 310A, 310B, 310C, . . . and the behavior management server 330 are connected to the network 101 such as the Internet. Here, in the third embodiment, it is assumed that a user with the user terminal 310B moves using an autonomous vehicle 370, which is a vehicle having an autonomous driving function such as a Personal Mobility Vehicle (PMV).

When it is not particularly necessary to distinguish the user terminals 310A, 310B, 310C, . . . from each other, any one of the user terminals 310A, 310B, 310C, . . . is referred to as the user terminal 310.

The number of the user terminals 310A, 310B, 310C, . . . is not particularly limited.

As illustrated in FIG. 2, a user terminal 310 in the third embodiment includes an input unit 311, the communication unit 112, the display unit 113, the position detection unit 114, the storage unit 115, and a control unit 316.

The communication unit 112, the display unit 113, the position detection unit 114, and the storage unit 115 of the user terminal 310 in the third embodiment are the same as the communication unit 112, the display unit 113, the position detection unit 114, and the storage unit 115 of the user terminal 110 in the first embodiment, respectively.

The input unit 311 receives input of an instruction from a user. The input of the instruction from the user is also referred to as user input. For example, the input unit 311 receives, from the user, input of a desired behavior, which is a behavior desired by the user, or input about whether to approve an alternative plan described later.

In the third embodiment, the input unit 311 receives, as the desired behavior, input of user-related information, such as the age of the user, the number of adult companions, the number of child companions, and a means of transportation used by the user, in addition to a destination that is desired to be visited by the user. The control unit 316 generates desired behavior information indicative of the desired behavior input to the input unit 111 and causes the communication unit 112 to transmit the desired behavior information to the behavior management server 330, as in the first embodiment.

The control unit 316 controls processing in the user terminal 310.

For example, the control unit 316 generates the desired behavior information indicative of the desired behavior input by the input unit 311 and causes the communication unit 112 to transmit the desired behavior information to the behavior management server 330.

The control unit 316 also generates positional information indicative of the position detected by the position detection unit 114 and causes the communication unit 112 to transmit the positional information to the behavior management server 330.

Further, when the communication unit 112 receives alternative plan information from the behavior management server 330, the control unit 316 judges whether the user of the user terminal 310 is using an autonomous vehicle. For example, when the user is using an autonomous vehicle, a communication address for communicating with the autonomous vehicle is stored in the storage unit 115. Therefore, the control unit 316 can judge whether the user is using an autonomous vehicle based on whether such a communication address is stored in the storage unit 115.

When the user is not using an autonomous vehicle, the control unit 316 generates an alternative plan screen image indicative of an alternative plan indicated by the alternative plan information and causes the display unit 113 to display the alternative plan screen image, as in the first embodiment. Then, when the input unit 111 receives input about whether to approve the alternative plan from the user, the control unit 316 generates approval information indicative of whether to approve the alternative plan and causes the communication unit 112 to transmit the approval information to the behavior management server 330.

Further, when the communication unit 112 receives route information from the behavior management server 330, the control unit 316 generates a route screen image indicative of a route indicated by the route information and causes the display unit 113 to display the route screen image.

Meanwhile, when the user is using an autonomous vehicle, the control unit 316 generates approval information indicative of approval and causes the communication unit 112 to transmit the approval information to the behavior management server 330.

Then, when the communication unit 112 receives the route information from the behavior management server 330, the control unit 316 transmits the route information to the autonomous vehicle via the communication unit 112. The autonomous vehicle 370 that has received the route information performs autonomous driving on the route indicated by the route information.

FIG. 13 is a block diagram schematically illustrating the configuration of the autonomous vehicle 370.

The autonomous vehicle 370 includes a communication unit 371, a control unit 372, and a drive unit 373.

The communication unit 371 performs communication via the network 101. For example, the communication unit 371 receives route information from the user terminal 310 and provides the route information to the control unit 372.

The control unit 372 controls the operation of the autonomous vehicle 370. For example, the control unit 372 controls the drive unit 373 in accordance with the route information provided from the communication unit 371, thereby driving the autonomous vehicle 370 on the route indicated by the route information.

The drive unit 373 is a driving mechanism for moving the autonomous vehicle 370.

FIG. 14 is a block diagram schematically illustrating the hardware configuration of the autonomous vehicle 370.

The autonomous vehicle 370 described above includes a communication I/F 31, a drive controller 32, a drive mechanism 33, a sensor 34, a non-volatile memory 35, a volatile memory 36, and a processor 37.

The communication unit 371 can be implemented by the communication I/F 31 such as an NIC, and the drive unit 373 can be implemented by the drive controller 32, the drive mechanism 33, and the sensor 34.

The drive controller 32 is, for example, a microcomputer including a memory and a processor, and controls the drive mechanism 33 in accordance with an instruction from the processor 37 and a detection result in the sensor 34.

The drive mechanism 33 is a mechanism for moving the autonomous vehicle 370. The drive mechanism 33 includes a motor, wheels, a steering wheel, and a brake.

The sensor 34 includes sensors that detect operations of various components or the like included in the drive mechanism 33, a sensor that detects a physical quantity such as the temperature of a component, a camera installed in the autonomous vehicle 370, and the like.

The control unit 372 can be implemented by the processor 37 reading out a program stored in the non-volatile memory 35 into the volatile memory 36 and executing the program.

Such a program may be provided through a network or may be provided by being recorded in a recording medium. That is, such a program may be provided as a program product, for example.

As illustrated in FIG. 4, the behavior management server 330 in the third embodiment includes the communication unit 131, a storage unit 332, a desired behavior specification unit 333, the route determination unit 134, the congestion prediction unit 135, the alternative plan determination unit 136, a target user decision unit 337, the proposal unit 138, and the output processing unit 139.

The communication unit 131, the route determination unit 134, the congestion prediction unit 135, the alternative plan determination unit 136, the proposal unit 138, and the output processing unit 139 of the behavior management server 330 in the third embodiment are the same as the communication unit 131, the route determination unit 134, the congestion prediction unit 135, the alternative plan determination unit 136, the proposal unit 138, and the output processing unit 139 of the behavior management server 130 in the first embodiment, respectively.

The storage unit 332 stores therein programs and data necessary for processing in the behavior management server 330. For example, the storage unit 332 stores therein the user management information indicative of information related to the contents which are to be proposed to a user, as well as the point addition condition information.

FIG. 15 is a schematic diagram illustrating a user management table 350, which is an example of the user management information in the third embodiment.

The user management table 350 illustrated in FIG. 15 is information in a table format, including a user ID column 350a, a desired content column 350b, a proposal content column 350c, an age column 350d, an adult companion number column 350e, a child companion number column 350f, a transportation means column 350h, and a registration date and time column 350g.

The user ID column 350a, the desired content column 350b, the proposal content column 350c, the age column 350d, the adult companion number column 350e, the child companion number column 350f, and the registration date and time column 350g of the user management table 350 in the third embodiment are the same as the user ID column 250a, the desired content column 250b, the proposal content column 250c, the age column 250d, the adult companion number column 250e, the child companion number column 250f, and the registration date and time column 250g of the user management table 250 in the second embodiment, respectively.

In other words, the user management table 350 of the third embodiment is obtained by adding the transportation means column 350h to the user management table 250 of the second embodiment.

The transportation means column 350h stores the name of the means of transportation, which is transportation means identification information indicative of the means of transportation of the user.

Figures 16, 17:
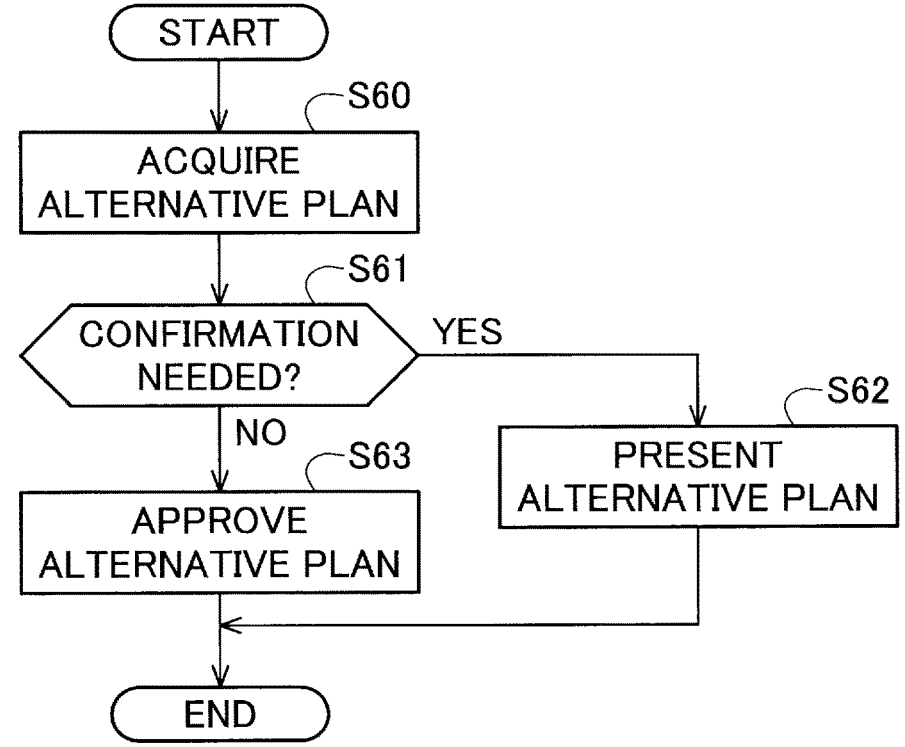
FIG. 16 is a schematic diagram illustrating a point addition condition table which is an example of point addition condition information in the third embodiment.
FIG. 17 is a flowchart illustrating an operation when a user terminal receives alternative plan information in the third embodiment.

FIG. 16 is a schematic diagram illustrating a point addition condition table 351 which is an example of the point addition condition information in the third embodiment.

The point addition condition table 351 illustrated in FIG. 16 is information in a table format, including a condition column 351a and an added point column 351b.

The condition column 351a stores a condition for point addition to the score of each user.

In the third embodiment, for a user using an autonomous vehicle as a means of transportation, point addition is performed because an alternative plan can be automatically set in the autonomous vehicle.

The added point column 351b stores a value to be added when the condition is satisfied.

The values illustrated in FIG. 16 are merely examples, and the values to be added are not limited thereto.

However, when the condition that an autonomous vehicle is being used is satisfied, the value to be added is desirably larger than the total of values added when all other conditions are satisfied. This is because the user who satisfies such a condition automatically accepts the alternative plan.

Returning to FIG. 4, the desired behavior specification unit 333 specifies a desired behavior which is a behavior desired by the user. Here, the desired behavior specification unit 333 specifies the desired behavior based on desired behavior information received by the communication unit 131. The desired behavior here includes the destination that is desired to be visited by the user and the user-related information.

The desired behavior specification unit 333 then adds the desired behavior thus specified to the user management information stored in the storage unit 332. Specifically, the desired behavior specification unit 333 adds a new row to the user management table 350 stored in the storage unit 332, stores the user ID of the user of the user terminal 310 that has transmitted the desired behavior information in the user ID column 350a of the row, stores the destination indicated by the desired behavior information in the desired content column 350b of the row, stores the age indicated by the desired behavior information in the age column 350d of the row, stores the number of adult companions indicated by the desired behavior information in the adult companion number column 350e of the row, stores the number of child companions indicated by the desired behavior information in the child companion number column 350f of the row, stores a means of transportation indicated by the desired behavior information in the transportation means column 350h of the row, and stores the date and time at which the row is added in the registration date and time column 350g of the row.

The target user decision unit 337 defines a plurality of users who are to visit the location predicted to become congested by the congestion prediction unit 135 as candidate users and decides a target user to which an alternative plan is to be proposed out of the candidate users.

In the third embodiment, the target user decision unit 337 decides, as the target user, a user who is most likely to accept the alternative plan out of the plurality of users.

The target user decision unit 337 defines one or more users who are behaving on a route partly including a congestion element out of the plurality of users as one or more candidate users, assigns values to the one or more candidate users based on a predetermined criterion, and decides, as the target user, a user having the highest score obtained by adding up the assigned values.

In the third embodiment, the target user decision unit 337 assigns a value to be added in such a manner that, by instructing a route, the score of the user who is using, as the means of transportation, an autonomous vehicle to automatically drive on the instructed route becomes the highest out of the one or more candidate users.

For example, the target user decision unit 337 assigns an initial value of the score to each candidate user. The initial value here is, for example, "0". Then, the target user decision unit 337 refers to the user management information and the point addition condition information both stored in the storage unit 332 and performs point addition for the candidate user who satisfies the condition indicated by the point addition condition information, thereby calculating the score for each candidate user.

The target user decision unit 337 then decides a user who has the highest score as the target user. In the third embodiment, in a case where a user using the autonomous vehicle 370 is included in the candidate users, the target user decision unit 337 decides such a user as the target user. Here, in a case where there is a plurality of users having the highest score, the target user decision unit 337 may decide one user selected from the users at random as the target user or may decide all the users as the target users.

FIG. 17 is a flowchart illustrating an operation when the user terminal 310 receives alternative plan information in the third embodiment.

In the user terminal 310 that has received the alternative plan information, the control unit 316 acquires the alternative plan information from the communication unit 112 (S60).

The control unit 316 judges whether it is necessary for the user of the user terminal 310 to confirm approval (S61). The control unit 316 judges that the user of the user terminal 310 needs to confirm the approval in a case where the user of the user terminal 310 does not use the autonomous vehicle 370 as a means of transportation, and judges that the user of the user terminal 310 does not need to confirm the approval in a case where the user of the user terminal 310 uses the autonomous vehicle 370 as a means of transportation. If confirmation of the approval is necessary (Yes in S61), the process proceeds to step S62. If confirmation of the approval is not necessary (No in S61), the process proceeds to step S63.

In step S62, the control unit 316 generates an alternative plan screen image indicative of an alternative plan indicated by the alternative plan information and causes the display unit 113 to display the alternative plan screen image. Then, when the input unit 311 receives input about whether to approve the alternative plan from the user, the control unit 316 generates approval information indicative of whether to approve the alternative plan and causes the communication unit 112 to transmit the approval information to the behavior management server 330. Further, when the communication unit 112 receives route information from the behavior management server 330, the control unit 316 generates a route screen image indicative of a route indicated by the route information and causes the display unit 113 to display the route screen image.

Meanwhile, in step S63, the control unit 316 generates approval information indicative of approval and causes the communication unit 112 to transmit the approval information to the behavior management server 330. Then, when the communication unit 112 receives route information from the behavior management server 330, the control unit 316 transmits the route information to the autonomous vehicle 370 via the communication unit 112. The autonomous vehicle 370 that has received the route information performs autonomous driving on the route indicated by the route information.

Figure 18:
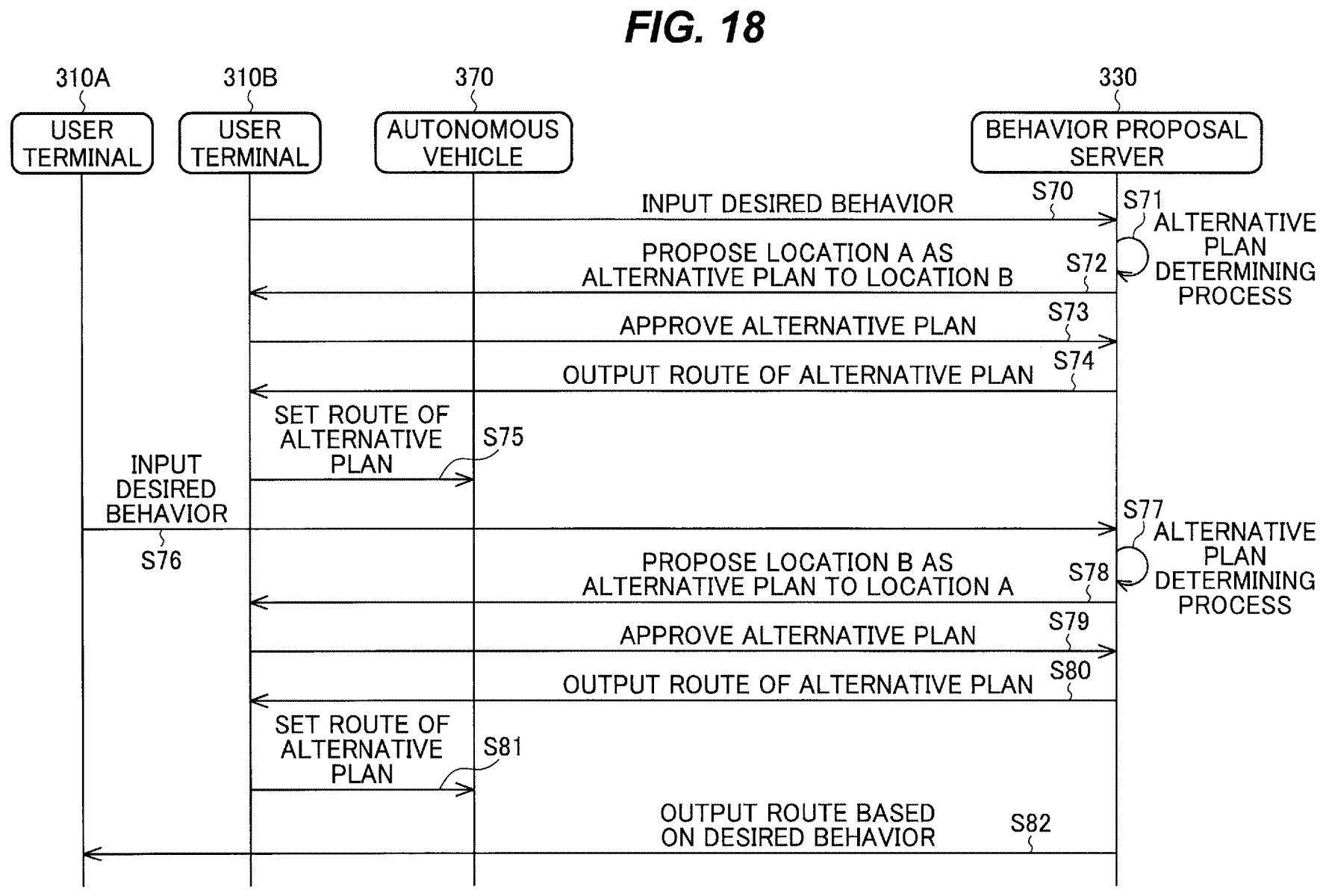

FIG. 18 is a sequence diagram for explaining a situation in which an alternative plan is proposed to a user different from a user who has input a desired behavior in the third embodiment.

Here, a description will be given assuming that the user terminals 310A and 310B receive input of respective desired behaviors.

First, the input unit 311 of the user terminal 310B receives input of the location B which is a desired destination and input of use of an autonomous vehicle as a means of transportation, as the desired behavior. The control unit 316 of the user terminal 310B generates desired behavior information indicative of the location B and the autonomous vehicle as the means of transportation and transmits the desired behavior information to the behavior management server 330 from the communication unit 112 (S70).

When the behavior management server 330 receives the desired behavior information indicative of the location B from the user terminal 310B, the route determination unit 134 of the behavior management server 330 determines a route from the current location of the user terminal 310B to the location B and specifies a waypoint included in the route. The congestion prediction unit 135 then predicts whether the location B and the waypoint become congested. Here, it is assumed that the location B is judged to become congested. In this case, for example, the alternative plan determination unit 136 determines an alternative plan to the location B (S71). Here, it is assumed that the location A is used as the alternative plan.

The target user decision unit 337 then decides the user of the user terminal 310B as a target user, and the proposal unit 138 proposes the changing of the destination from the location B to the location A as the alternative plan to the user of the user terminal 310B (S72).

In this case, the control unit 316 of the user terminal 310B generates approval information indicating that the alternative plan is approved without confirmation by the user of the user terminal 310B because the user is using the autonomous vehicle 370 as the means of transportation, and transmits the approval information to the behavior management server 330 via the communication unit 112 (S73).

In this case, the output processing unit 139 of the behavior management server 230 generates route information indicative of a route to the location A, which is the alternative plan, and causes the communication unit 131 to transmit the route information to the user terminal 310B (S74).

The control unit 316 of the user terminal 310B then transmits the route information to the autonomous vehicle 370 via the communication unit 112 and performs setting in the autonomous vehicle 370 to cause the vehicle to drive to the location A on the route indicated by the route information (S75).

In the situation described above, the input unit 311 of the user terminal 310A receives input of the location A, which is a desired destination, and walking, which is a means of transportation, as the desired behavior. The control unit 316 of the user terminal 310A generates desired behavior information indicative of the location A and walking as the means of transportation and transmits the desired behavior information to the behavior management server 330 from the communication unit 112 (S76).

When the behavior management server 330 receives the desired behavior information indicative of the location A from the user terminal 310A, the route determination unit 134 of the behavior management server 330 determines a route from the current location of the user terminal 310A to the location A and specifies a waypoint included in the route. The congestion prediction unit 135 then predicts whether the location A and the waypoint become congested. Here, it is assumed that the location A is judged to become congested. In this case, for example, the alternative plan determination unit 136 determines an alternative plan to the location A (S77). Here, it is assumed that the location B is used as the alternative plan.

In such a case, the target user decision unit 337 assigns a high score to the user of the user terminal 310B who is using an autonomous vehicle as the means of transportation, thereby deciding the user of the user terminal 310B as the target user. The proposal unit 138 then proposes the setting of the location B as the destination to the user of the user terminal 310B, as an alternative plan to the location A (S78).

In this case, the control unit 316 of the user terminal 310B generates approval information indicating that the alternative plan is approved without confirmation by the user of the user terminal 310B because the user is using the autonomous vehicle 370 as the means of transportation, and transmits the approval information to the behavior management server 330 via the communication unit 112 (S79).

The output processing unit 139 of the behavior management server 330 generates route information indicative of a route to the location B as the alternative plan, and causes the communication unit 131 to transmit the route information to the user terminal 310B (S80).

The control unit 316 of the user terminal 310B then transmits the route information to the autonomous vehicle 370 via the communication unit 112 and performs setting in the autonomous vehicle 370 to cause the vehicle to drive to the location B on the route indicated by the route information (S81).

The output processing unit 139 of the behavior management server 330 also generates route information indicative of a route to the location A, which is the desired destination, and causes the communication unit 131 to transmit the route information to the user terminal 310A (S82).

As described above, in the third embodiment, since the score for deciding the target user is calculated also based on information related to the user, the target user to whom the alternative plan is to be proposed can be decided according to the situation of the user.

The conditions illustrated in FIG. 11 are merely examples, and point addition to the score may be performed under other conditions. For example, approval history information indicative of the number of approvals of an alternative plan in the past for each user may be stored in the storage unit 332 of the behavior management server 330, and an alternative location selection tendency that becomes a larger value as the number of approvals increases may be added to the score of each user in addition to or instead of the above example.

In the first to third embodiments described above, the position detection unit 114 detects the position of the user terminal 110 by using the GPS, but the first to third embodiments are not limited thereto. For example, the position detection unit 114 may detect the position of the user terminal 110 to 310 by receiving input of the position from the user via the input unit 111 to 311.

In the first to third embodiments described above, the congestion prediction unit 135 of the behavior management servers 130 to 330 predicts congestion of a destination and a waypoint. However, the first to third embodiments are not limited thereto. For example, the congestion prediction unit 135 can judge whether each section constituting a route determined by the route determination unit 134 is congested. Here, the section can be, for example, a road between the destination and a waypoint closest to the destination, a road between adjacent waypoints, and a road between the current location of the user terminal 110 to 310 and a waypoint closest to the current location.

In such a case, the alternative plan determination unit 136 can determine an alternative plan in which a congested section judged to become congested is replaced with another section. Here, the case where the congested section is replaced with another section includes not only replacing the congested section with another road but also replacing the congested section with a road passing through another waypoint.

In the above case, elements included in the route are the destination and the section.

Although the input units 111 to 311 of the user terminals 110 to 310 in the first to third embodiments described above each receive input of one destination, the first to third embodiments are not limited thereto. For example, the input units 111 to 311 may receive input of a plurality of destinations. In this case, the route determination unit 134 of the behavior management servers 130 to 330 may determine a route by using a known algorithm such as a solution of the traveling salesperson problem.

The congestion prediction unit 135 of each of the behavior management servers 130 to 330 in the first to third embodiments described above predicts whether a destination and a waypoint become congested. However, the first to third embodiments are not limited thereto. For example, the congestion prediction unit 135 may predict congestion only at the destination. In this case, the alternative plan determination unit 136 determines an alternative plan to the destination which is an element judged to become congested.

Although the input units 111 to 311 of the user terminals 110 to 310 in the first to third embodiments described above receive input of a destination, the first to third embodiments are not limited thereto. For example, each of the desired behavior specification units 133 to 333 of the behavior management servers 130 to 330 may specify the direction in which a user is heading by acquiring the current position of the associated one of the user terminals 110 to 310 used by the user, and it may automatically specify a past destination present in the heading direction as a current destination based on history information regarding the behavior of the user.

In the third embodiment described above, the input unit 311 of the user terminal 310 receives, as the desired behavior, input of user-related information regarding a behaving person and a means of transportation, in addition to the destination. However, the third embodiment is not limited thereto. For example, the input unit 311 may receive input of a means of transportation only, as the user-related information. Also in this case, a user who is using the autonomous vehicle 370 is preferentially selected as the target user.

What is claimed is:

1. A behavior management device that manages behaviors of a plurality of users, comprising:
   a processor to execute a program; and
   a memory to store the program which, when executed by the processor, performs processes of,
   acquiring, from a desiring user included in the plurality of users, a desired behavior including at least a destination desired to be visited by the desiring user;
   determining a route to the destination;
   predicting whether or not an element included in the route becomes congested;
   determining an alternative plan indicative of at least an alternative element that is an alternative to a congestion element which is the element predicted to become congested in order to avoid congestion of the congestion element;
   deciding a target user to whom the alternative plan is to be proposed out of a plurality of candidate users, the plurality of candidate users being the desiring user and one or more users apart from the desiring user in the plurality of users, the one or more users traveling on a route partly including the congestion element;

proposing the alternative plan to the target user;

generating route information based on the proposed alternative plan; and controlling an autonomous vehicle of the target user based on the generated route information associated with the proposed alternative plan, wherein the processor assigns values to the plurality of candidate users based on a predetermined criterion, and decides, as the target user, a user having a highest score obtained by adding up the assigned values.

2. The behavior management device according to claim 1, wherein the processor decides, as the target user, a user who is most likely to be satisfied out of the plurality of candidate users based on the assigned values, by accepting the alternative plan.

3. The behavior management device according to claim 1, wherein the processor decides, as the target user, a user who is most likely to accept the alternative plan out of the plurality of candidate users, based on the assigned values.

4. The behavior management device according to claim 1, wherein the processor assigns the value such that the score of a user behaving after having already accepted another alternative plan that substitutes the congestion element for the alternative element becomes the highest out of the plurality of candidate users.

5. The behavior management device according to claim 1, wherein the processor assigns the value such that by indicating a route, the score of a user using, as a means of transportation, the autonomous vehicle to autonomously drive on the indicated route becomes the highest out of the plurality of candidate users.

6. A non-transitory computer-readable storage medium storing a program that causes a computer to serve as a behavior management device for managing behaviors of a plurality of users, the program causing the computer to-execute processes comprising:

acquiring, from a desiring user included in the plurality of users, a desired behavior including at least a destination desired to be visited by the desiring user;

determining a route to the destination;

predicting whether or not an element included in the route becomes congested;

determining an alternative plan indicative of at least an alternative element that is an alternative to a congestion element which is the element predicted to become congested in order to avoid congestion of the congestion element;

deciding a target user to whom the alternative plan is to be proposed out of a plurality of candidate users, the plurality of candidate users being the desiring user and one or more users apart from the desiring user in the plurality of users, the one or more users traveling on a route partly including the congestion element;

proposing the alternative plan to the target user;

generating route information based on the proposed alternative plan; and controlling an autonomous vehicle of the target user based on the generated route information associated with the proposed alternative plan, wherein the program causes the computer to further execute a process of assigning values to the plurality of candidate users based on a predetermined criterion, and deciding, as the target user, a user having a highest score obtained by adding up the assigned values.

7. A behavior management method for managing behaviors of a plurality of users, comprising:

acquiring, from a desiring user included in the plurality of users, a desired behavior including at least a destination desired to be visited by the desiring user;

determining a route to the destination;

predicting whether or not an element included in the route becomes congested;

determining an alternative plan indicative of at least an alternative element that is an alternative to a congestion element which is the element predicted to become congested in order to avoid congestion of the congestion element;

deciding a target user to whom the alternative plan is to be proposed out of a plurality of candidate users, the plurality of candidate users being the desiring user and one or more users apart from the desiring user in the plurality of users, the one or more users traveling on a route partly including the congestion element;

proposing the alternative plan to the target user;

generating route information based on the proposed alternative plan; and controlling an autonomous vehicle of the target user based on the generated route information associated with the proposed alternative plan, wherein the method further comprises assigning values to the plurality of candidate users based on a predetermined criterion, and deciding, as the target user, a user having a highest score obtained by adding up the assigned values.

* * * * *